Figure 3:
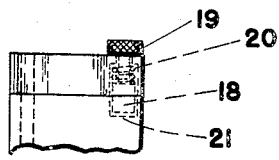

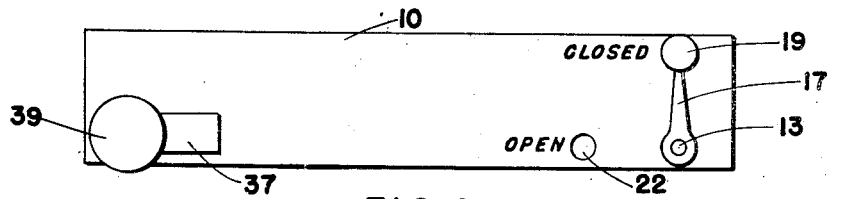
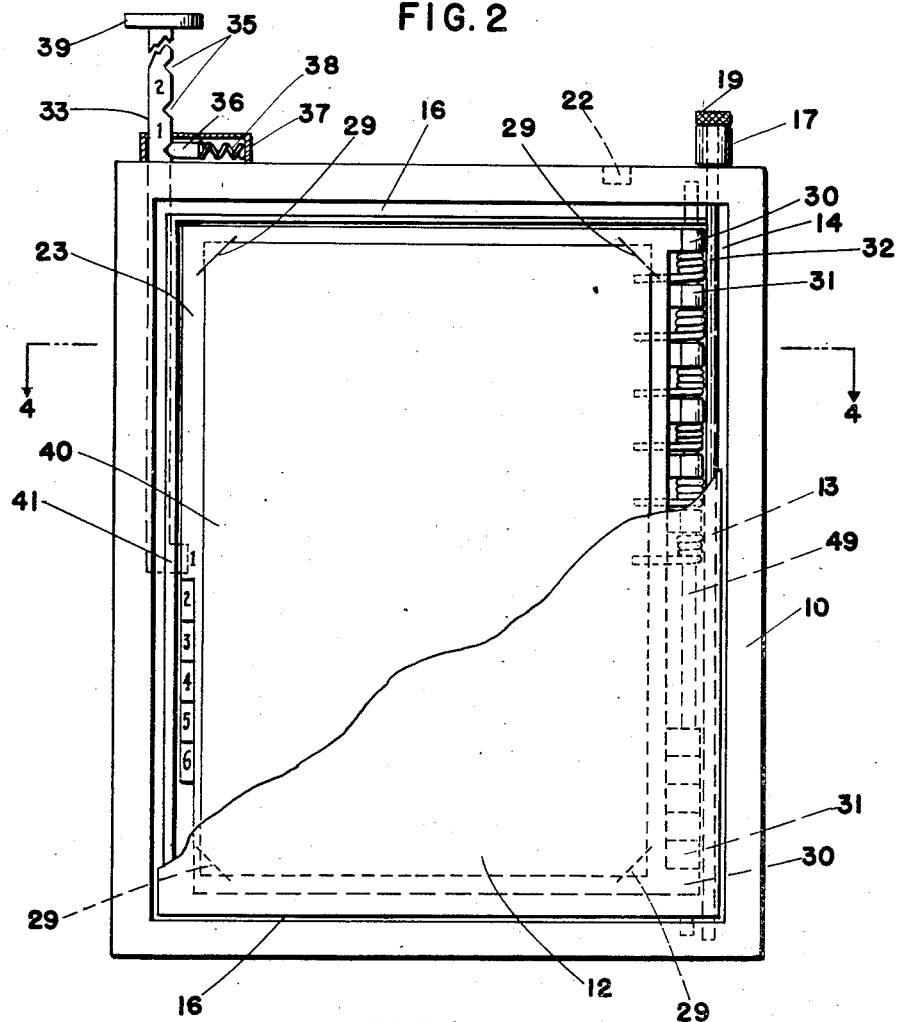

Aug. 6, 1946.                P. W. DUKE                2,405,195
                            FILM MAGAZINE
                         Filed May 29, 1944            2 Sheets-Sheet 2

INVENTOR.
PAUL W. DUKE
BY
ATTORNEY

Patented Aug. 6, 1946

2,405,195

UNITED STATES PATENT OFFICE 2,405,195

FILM MAGAZINE

Paul W. Duke, United States Navy

Application May 29, 1944, Serial No. 537,880

10 Claims. (Cl. 95—19)

(Granted under the act of March 3, 1883, as amended April 30, 1928; 370 O. G. 757)

This invention relates to film magazines of the type used in hand cameras and more particularly to a magazine for automatically feeding, in sequence, a series of cut films into the focal plane of the camera.

Film packs used in magazine cameras of the type here considered may be composed of flexible film, or a series of stacked plates. In either case, however, the exposed film must be removed manually by the operator from the focal plane of the camera to position an unexposed film therein. This manual operation may comprise pulling a strip of paper from the magazine, moving a plate by means of a flexible leather cover, or some similar equivalent manual manipulation. These operations, which necessitate the relocating of the subject in the viewfinder for each exposure, require the operator's time and attention and preclude the use of such cameras for taking a series of pictures in rapid succession.

It is the object of this invention to provide a film magazine which does not require manual shifting of the film for each exposure.

It is a further object of this invention to provide a film magazine which automatically removes exposed film and positions unexposed film.

It is a further object of this invention to provide a film magazine with manually controlled means for automatically moving the film.

It is a further object of this invention to provide spring actuated means for sequentially feeding film into the focal plane of a camera subject to the control of the operator.

According to the invention, a film magazine of conventional configuration is provided with a plurality of plates hinged at one edge about a common pivot or pintle located in the magazine closely adjacent one side thereof whereby they may be swung in or out of the magazine like pages in a book. These plates, which carry the film, are provided with means tending to swing them out of the magazine and into the camera with which it is used where they assume a position approximately parallel to the side wall of the camera. These plates are released one by one by a releasing means under the control of the operator. When one plate has been exposed, it is released to swing out of the face of the magazine whereupon the next plate swings into the face thereof ready to be exposed. The magazine is provided with a manually operable light proof cover which also may be opened to a position normal to the magazine. This cover also serves to swing the plates carrying the exposed film back into the magazine when the camera is to be closed, or the magazine is to be removed.

Figure 4:
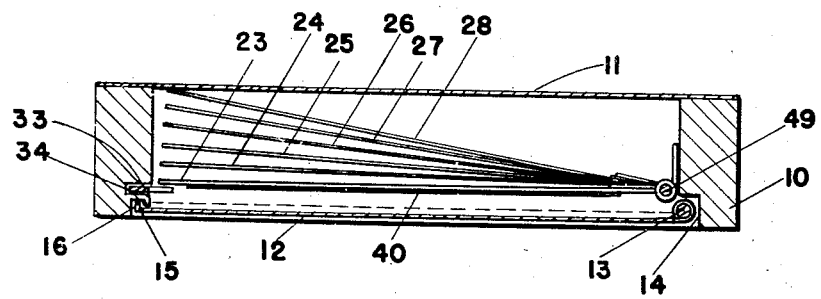
Figure 5:
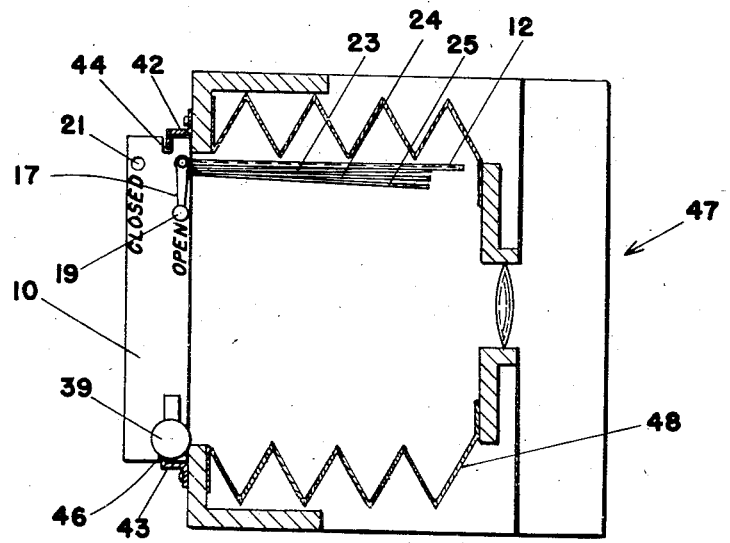

In the drawings, Fig. 1 is an elevation of a magazine embodying the principles of the invention with the cover partially broken away to disclose the film carrying plates; Fig. 2 is a plan view thereof; Fig. 3 is a fragmentary side view showing the cover actuating and locking means; Fig. 4 is a sectional view on the line 4—4 of Fig. 1; and Fig. 5 shows, on a reduced scale, the magazine affixed to a camera with the cover and several exposed plates swung out against the side of the camera.

The magazine comprises a rectangular frame 10 of suitable material having the back thereof closed by a thin opaque sheet 11. The front of the frame 10 is provided with a hinged cover 12. This cover is fastened to a rod 13 journaled in the frame at one side thereof in a recess 14 in one of the frame members. The rod 13, with the edge of the cover bent therearound and securely attached thereto, is closely adjacent the frame and the recess 14 may be lined with black velvet which the rod and cover edge would engage to prevent the leakage of light when the magazine is not in the camera. The rod 13 projects through the upper frame member and has a lever 17 affixed thereto by which the cover may be swung to open or close the magazine. The end of the lever 17 carries a latching means whereby the cover may be locked in open or closed position. This latch, as shown in Fig. 3, comprises a bolt 18 having a knurled finger piece 19 slidably carried in a recess in the lever which also houses the spring 20 which urges the bolt into a depression 21 in the top of the frame to hold the cover closed. A depression 22 is also provided in the top of the frame approximately 90° removed from the other depression in order that the bolt 18 may engage the same to hold the cover 12 in open position as shown in Fig. 5. The cover is provided with a flange 15 around its outer edge which fits in a groove 16 cut in the front of the frame members. This groove may be lined with black velvet to further insure a light tight closure for the magazine.

The magazine is provided with a plurality of hinged plates upon which the film is mounted. Six plates 23, 24, 25, 26, 27 and 28 are shown though any desired number may be used. The plates are of some suitable material such as aluminum and are of a sufficient thickness to maintain a plane surface in the focal plane of the camera with which it is used. The film 40 is affixed to plate 23 by inserting the corners thereof in slits 29 formed in each corner of the plate.

The other plates may similarly carry film which has not been shown thereon in the interest of clarity. Any other means for affixing the film may, of course, be used, such as by tape, guides, grommets, etc. Each plate is provided with a pair of hinges, for example, plates 23 and 24 have hinges 30 and 31, respectively, which are formed integral therewith and extend a short distance from the edge of the plates. The center line of the hinges of each plate lies in a plane with the plate and turn on a pintle 49 mounted in the frame 10 adjacent the rod 13. The upper hinges of the several plates are vertically spaced from each other to permit coiled springs 32, one for each plate, to be mounted on the pintle 49 between the hinges. One end of the springs engage the frame while the other ends engage their respective plates. These springs are tensioned to turn the plates about the pintle 49 in a counterclockwise direction as viewed in Fig. 4, i. e. out of the magazine to a position normal to the face thereof and possess sufficient force to hold the plates in position either in the face of the magazine or at the side of the camera regardless of the position in which the latter may be held. The plates are numbered to indicate the sequence in which the film carried thereby will be exposed.

The plates are normally held in the magazine by a manually operated releasing means designed to release them, one by one, to permit the springs to rotate them out of the magazine. This means comprises a bar 33 slidably mounted in a slot 34 cut in the side of the frame opposite that side to which the cover is hinged and having a finger 41 which projects into the open front of the magazine over the free edge of the plates. The bar 33 projects through the top of the frame 10 and is provided with notches 35 and a thumb piece 39. A detent 36, housed in member 37, through which the bar 33 passes, is urged into engagement with the bar by a spring 38 to engage the notches to releasably hold the bar in any one of several positions. The plates are cut away along the free edge thereof, i. e. the edge opposite to that carrying the hinges, in varying amounts to an extent sufficient to clear the finger 41. The plate 23 has a relatively large cutaway portion and succeeding plates are cut away a progressively decreasing amount. The finger 41 engages the plate 23 immediately above the cutaway portion. When the bar 33 is pushed down one notch, the finger will clear the plate 23 which will then swing out of the way under the influence of spring 32, permitting the next plate 24 to swing into the face of the magazine where it will be held by finger 41 until the bar 33 is lowered another notch. The notches 35 in the bar 33 are spaced a distance equal to the difference in the cutaway portion of the several plates and, with the detent, serve to indicate the extent of movement necessary to effect the release of a plate.

The magazine is loaded in a dark room by affixing cut film to the several plates which are then swung into the magazine. Bar 33 is then positioned to permit the finger 41 to engage the first plate to hold it and the rest of the plates in the magazine. The cover is then latched in closed position and the magazine is ready for use. The magazine may be fitted on the back of a camera 47, Fig. 5, by any suitable means, such as by guides 42 and 43 which engage grooves 44 and 46 cut in the sides of the frame 10. The camera shown, in open position, is of the folding type and has a bellows 48. The cover of the magazine is then swung to open position by unlatching the bolt 18 and turning the lever 17. Plate 23 is then ready for exposure and when exposed may be released to a position substantially parallel to the cover 12 by pressing the bar 33 down one notch whereupon plate 24 swings into position ready for exposure. After some or all of the plates have been exposed and it is desired to close the camera or remove the magazine the cover 12 is turned to closed position by means of lever 17. This movement of the cover 12 also swings the exposed plates back into the magazine where they are held by the cover when the latter is locked closed. If some of the plates carry unexposed film, reopening of the cover when the magazine is in the camera will permit the exposed film to swing out of the magazine while the unexposed film is retained by the finger 41 ready for use.

While I have described the preferred form of my invention I do not wish to limit myself to the precise details shown, but wish to avail myself of such variations and modifications as may come within the scope of the appended claims.

The invention described herein may be manufactured and used by or for the Government of the United States of America for governmental purposes without the payment of any royalties thereon or therefor.

I claim:

1. A film magazine comprising a frame closed at the back, plates adapted to carry light sensitive material thereon, means hinging said plates in said frame about a common axis and in the same plane therewith and spring means for rotating said plates out of said frame.

2. A film magazine comprising a frame, said frame closed at the back, a light tight closure for the front of said frame, means hinging said closure to said frame, means external of said frame for operating said closure, plates for said magazine adapted to carry film, a pintle adjacent said hinging means, said plates hinged on said pintle to present each of said plates in the face of said frame in turn, and springs tensioned to rotate said plates out of said magazine.

3. A film magazine as claimed in claim 2 and releasing means selectively retaining said plates within said frame.

4. A film magazine comprising a frame closed at the back, plates adapted to carry light sensitive material thereon, means hinging said plates in said frame about a common axis and in the same plane therewith to present each of said plates in the face of said frame in turn, spring means acting on said plates to swing said plates about said common axis out of said frame and hold said plates normal to said frame.

5. A film magazine as designed in claim 4 and means for successively retaining said plates in the face of said frame.

6. A film magazine as claimed in claim 4 means for successively retaining said plates in the face of said frame and a closure for said frame, means hinging said closure adjacent the first mentioned hinging means whereby closing said closure will return any plates swung out of said frame to a position within said frame.

7. A film magazine comprising a frame closed at the back, plates adapted to carry light sensitive material thereon, means hinging said plates in said frame to rotate about a common axis to swing in turn into one position in the face of said frame parallel to the back thereof, said plates being in the plane of said axis, motor means coupled to each of said plates to rotate said plates from within said frame to a position without said frame.

8. A film magazine as claimed in claim 7 and means for releasibly retaining said plates in said frame against the action of said motor means.

9. A film magazine comprising a frame closed at the back, plates adapted to carry light sensitive material thereon, means hinging said plates adjacent one side of said frame, said hinging means lying in the plane of said plates whereby said plates will sequentially assume the same relative position in the face of said frame, a spring on said hinging means for each of said plates said springs tensioned to rotate each of said plates out of said frame and hold them normal thereto, means carried by said frame opposite said hinging means for successively holding and releasing each of said plates in the face of said frame against said spring tension, a closure for the face of said frame, means journaling said closure on said frame, said journaling means being adjacent and parallel to said hinging means, and means external of said frame for operating and locking said closure, whereby closing of said closure will swing any of said plates released by said means for releasing said plates back into said frame.

10. A film magazine comprising a frame closed at the back, a closure adapted to close the front of said frame, means hinging said closure at one side of said frame, means external of said frame for operating and latching said closure in open or closed position, a pintle in said frame adjacent said hinging means, plates adapted to carry film hinged on said pintle to swing in and out of said frame, springs tensioned to rotate said plates out of said frame, whereby closing of said closure will rotate said plates into said frame and means releasably holding said plates in said frame against said spring tension, said last mentioned means comprising a slot in said frame, a rod in said slot projecting externally of said frame, a finger on said rod projecting over the edge of said plates, said finger cooperating with cut out portions of said plates to release said plates when said rod is moved and means indicating the extent of movement of said rod to effect the release of one of said plates.

PAUL W. DUKE.